United States Patent Office 2,935,092
Patented May 3, 1960

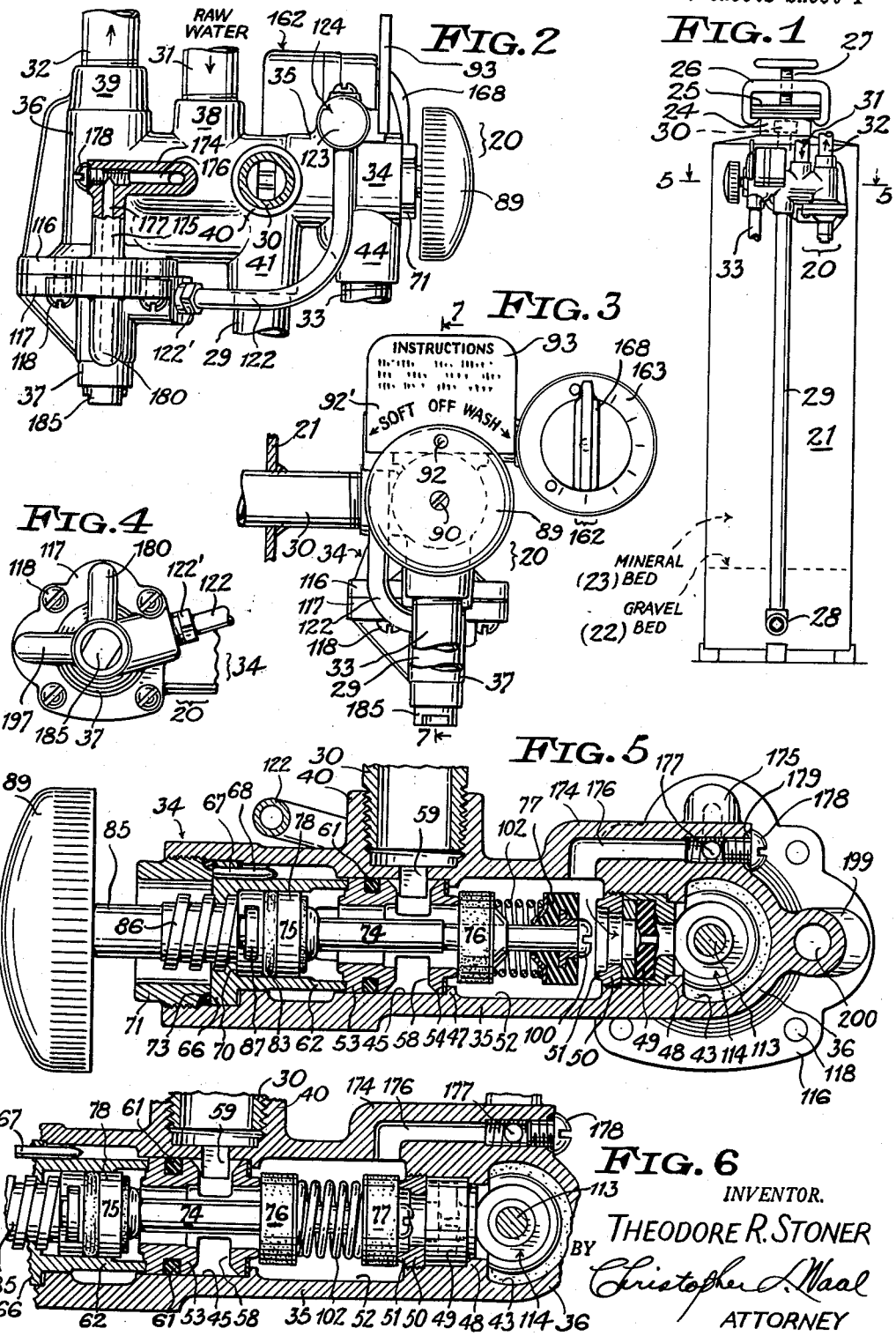

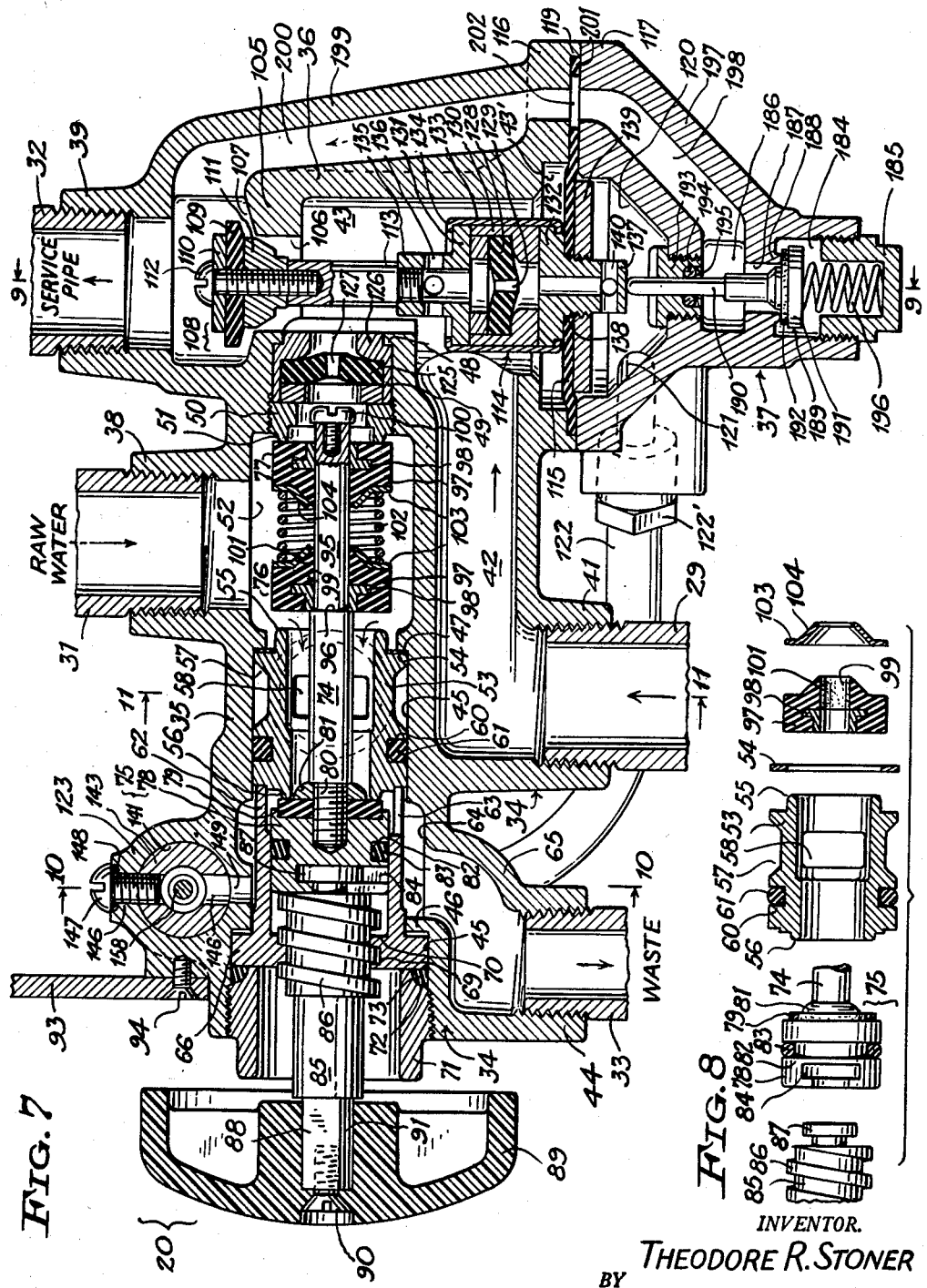

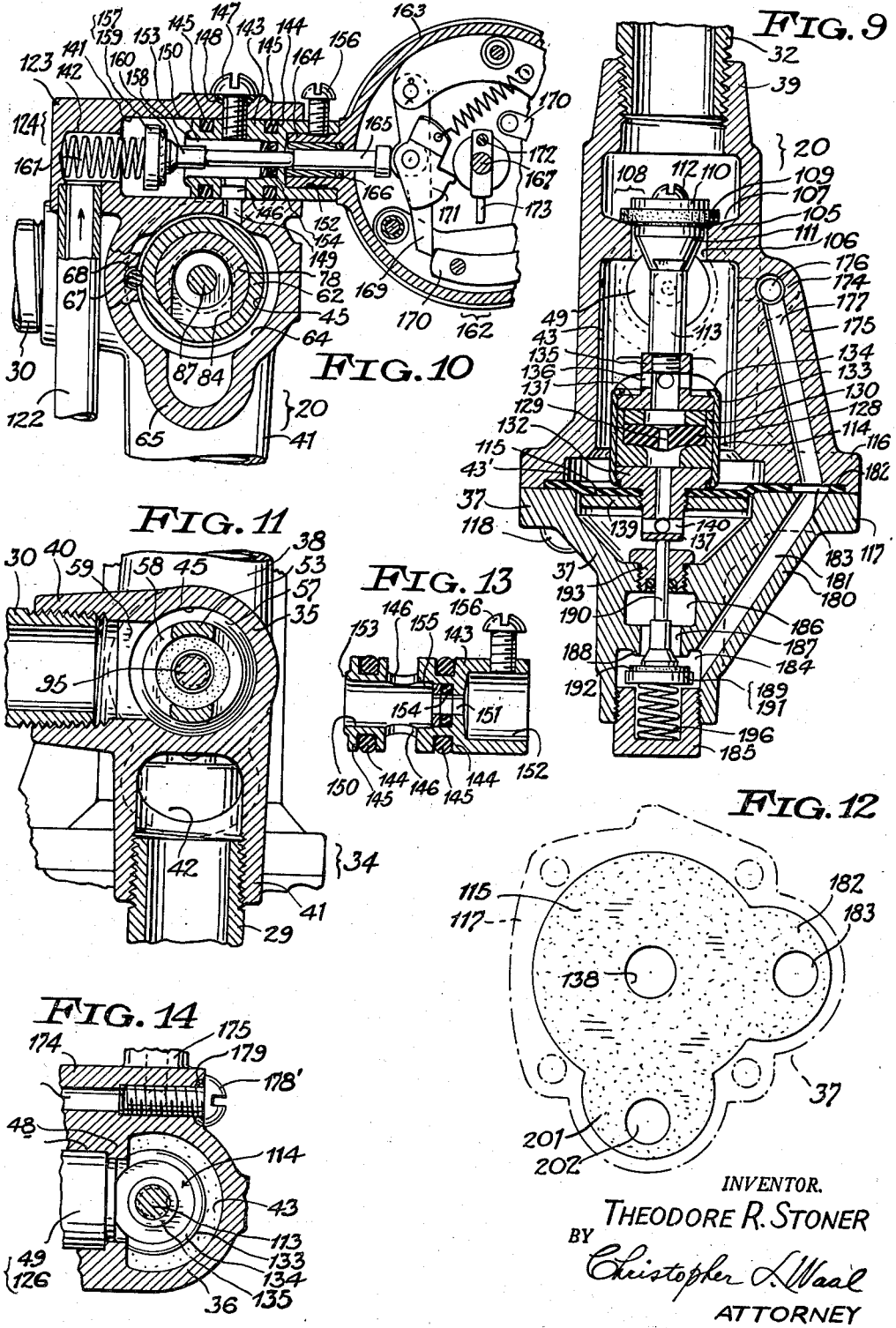

2,935,092

WATER SOFTENER CONTROL VALVES

Theodore R. Stoner, Stevens Point, Wis.

Application March 15, 1956, Serial No. 571,704

4 Claims. (Cl. 137—627.5)

The present invention relates to control valves adapted for use with water conditioning apparatus, such as softeners and filters.

An object of the invention is to provide an improved control valve adapted for use with water softening apparatus of the base exchange type, and which is so arranged as to facilitate installation, manipulation and servicing.

Another object is to provide a water softener control valve which will accurately control back-washing and regeneration of the softener regardless of variations in water pressure, which will automatically prevent flow of salt brine into the service line during the regeneration period, and which will automatically furnish an optional emergency supply of hard water to the service line during this period.

A further object is to provide a water softener control valve which is of simple and durable construction, which is capable of inexpensive manufacture and easy assembly, and which is reliable in operation.

The invention further consists in the several features hereinafter described and claimed.

In the accompanying drawings,

Fig. 1 is an elevational view of a water softening and filtering tank installation including a control valve of the invention;

Fig. 2 is a side elevational view of the control valve, parts being broken away and parts being shown in section;

Fig. 3 is a front end elevational view of the control valve as it appears when connected to the tank, a wall of the tank being shown in section;

Fig. 4 is a fragmentary bottom view of the control valve;

Fig. 5 is a horizontal longitudinal sectional view of the control valve taken generally on the line 5—5 of Fig. 1, the valve being shown in back-washing position;

Fig. 6 is a sectional view similar to Fig. 5, the control valve being shown in its off or stopped position to permit opening of the tank;

Fig. 7 is an enlarged longitudinal vertical sectional view of the control valve taken generally on the line 7—7 of Fig. 3, the control valve being shown in position for water softening;

Fig. 8 is an exploded view of interior parts of the control valve;

Fig. 9 is a transverse vertical sectional view taken generally on the line 9—9 of Fig. 7, the control valve being shown in regenerating position;

Fig. 10 is a transverse vertical sectional view taken generally on the line 10—10 of Fig. 7, a time-controlled pilot valve mechanism being shown in its open position;

Fig. 11 is a transverse vectical sectional view taken generally on the line 11—11 of Fig. 7;

Fig. 12 is a detail plan view of a diaphragm, an associated casing member being shown in broken lines;

Fig. 13 is a detail sectional view of a pilot valve sleeve or barrel, and

Fig. 14 is a fragmentary sectional view similar to Fig. 6, a raw water by-pass duct of the control valve being blocked.

In the drawing, the numeral 20 designates generally a control valve constructed in accordance with the invention. The valve is adapted for use with a combined water softener and filter of the single tank type, here shown to comprise an upright mineral tank 21 having the usual gravel bed 22 at its lower end supporting the usual mineral or zeolite bed 23, both of these beds having a filtering action on the water which normally flows downwardly in the tank. The tank has the usual flanged neck 24 at its upper end closed by a gasketed cover plate 25 which is detachably secured to the neck by a C-shaped clamp 26 and a clamping screw 27. In some instances, the neck or upper portion of the tank may provide a head space above the water level. At it lower portion the tank is provided with a lateral outlet pipe 28 which extends in the gravel bed 22 and has its outer end connected to the valve 20 by an upwardly projecting vertical pipe 29, as hereinafter described, the valve being placed near the upper end of the tank. At its upper end the tank has a screened inlet pipe 30 which projects laterally from the tank, preferably below the level of the tank neck, the inlet pipe being arranged in the same vertical plane as the outlet pipe 28 and the vertical pipe 29. The valve is also connected as hereinafter described to a vertical supply pipe 31 which conducts raw or hard water under pressure, and to a vertical service pipe or house line 32 which conducts the softened water from the tank to the usual water heater, not shown, and also in some instances directly to a faucet, not shown. The tank installation further includes a downwardly projecting drain pipe 33 which is connected to the valve, as hereinafter described. The water is softened during its downward flow in the tank, and the valve can be manipulated, as hereinafter described, to effect flushing or back-washing of the filter beds in the tank in an upward direction, and to effect time-controlled regeneration and rinsing by downward flow in the tank.

The valve 20 includes a body or casing 34 of cast brass or other suitable metal comprising a main tubular portion 35 which is integrally joined at its rear end to a transverse tubular portion 36, the axes of the two tubular portions being perpendicular to each other and lying in the same plane. The main tubular portion 35 preferably extends horizontally and the transverse tubular portion 36 preferably extends vertically. The lower end of the vertical tubular portion 36 is closed by a detachable hollow cover or casing member 37, as hereinafter described.

The horizontal tubular portion 35 has formed thereon near its rear end an upwardly projecting internally threaded inlet boss 38 to which the vertical supply pipe or raw water pipe 31 is connected. The vertical tubular portion 36 has at its upper end a coaxial, upwardly projecting internally threaded outlet boss 39 to which the vertical service pipe or house line 32 is connected. Forwardly of the inlet boss 38, the horizontal tubular portion 35 has formed thereon a laterally projecting internally threaded boss 40 which is connected to the upper tank pipe 30, and a downwardly projecting internally threaded boss 41 which is connected to the vertical pipe 29 extending to the lower tank pipe 28. The axes of the pipe bosses 40 and 41 are arranged in a common vertical plane normal to the axis of the tubular body portion 35, and the pipe bosses 38 and 39 project upwardly, thus facilitating making piping connections to the tank. A horizontal water passage 42 is formed in the casing along the lower side of the horizontal body portion 35 and provides communication between the downwardly projecting pipe boss 41 and a chamber 43 formed in the vertical tubular body portion 36. A downwardly projecting internally threaded drain boss 44 is formed on the horizontal tubular body portion 35 near the front thereof and is connected to the drain pipe 33.

The tubular body portion 35 has formed axially therein a stepped cylindrical bore 45 which extends from the front end of the body portion to the chamber 43 in the hollow vertical body portion 36, the stepped bore 45 decreasing in size toward the chamber 43 and forming therein a series of axially spaced forwardly facing annular shoulders 46, 47, and 48. A flow restrictor 49, hereinafter more fully described, fits in the rear portion of the bore 45 near the chamber 43 and bears against the annular shoulder 48. The flow restrictor, which limits the rate of back-wash flow, is held against the shoulder 48 by a retaining ring 50 which is threaded into the bore and is provided with a forwardly facing valve seat 51. Forwardly of the seat-forming ring, the tubular body portion is cored out to form a raw water supply chamber or inlet chamber 52 which communicates with the inlet boss 38. Forwardly of the inlet chamber a tubular port-forming cage 53 detachably fits in the bore 45 and has its rear end bearing against the annular shoulder 47 through an interposed gasket 54. The cage 53 has a rearwardly facing annular valve seat 55 at its rear end and a slightly smaller forwardly facing annular valve seat 56 at its front end, this seat extending about the port-forming interior of the cage. At its intermediate portion the tubular cage has an exterior annular recess or groove 57 and one or more radial ports 58 opening to this groove. The tubular body portion 35 has a slot-like port 59 which registers with the cage groove 57 and provides communication between the interior of the cage and the interior of the pipe boss 40, Fig. 11. Forwardly of the annular groove 57 and port 59 the tubular cage is provided with an annular groove 60 receiving an O-ring 61 of neoprene or the like in sealing engagement with the walls of the bore 45.

A packing sleeve or guide sleeve 62 slidably fits in the bore 45 forwardly of the tubular cage and has a rear edge portion bearing against the annularly shouldered front face of the cage around the valve seat 56, the rear edge portion of the packing sleeve being provided with one or more port-forming notches 63. The tubular body portion 35 is cored out around the sleeve to form a drain chamber 64 which communicates with the downwardly projecting pipe boss 44, the latter having a rearwardly offset pocket 65 into which the drain chamber opens. The packing sleeve 62 has a flat-faced annular front flange 66 which is spaced slightly forward of the annular shoulder 46 in the tubular body portion 35 and slidably fits in the enlarged front end of the bore 45. The flange 66 carries a rearwardly projecting pin 67, Figs. 5 and 10, which extends in a notch 68 formed in the tubular body portion, thus preventing rotation of the sleeve and locating one of the drain notches 63 at the bottom of the sleeve. The sleeve front flange has a central interior screw-thread 69 to receive valve-actuating means hereinafter described, and the interior rear portion of the flange presents an annular stop shoulder 70 for the actuating means.

A bushing 71 is screwed into the enlarged front end of the bore 45 and bears against the front face of the sleeve flange 66, pressing the sleeve rearwardly against the tubular cage 53 to hold the latter in position. The rear end of the bushing 71 has an annular rabbet or chamfer 72 receiving an O-ring 73 engaging the sleeve flange 66, thus providing a seal.

A valve stem 74 extends axially in the tubular body portion 35 and through the cage 53 and carries thereon three axially spaced valve members, designated 75, 76, and 77, and hereinafter described. The valve member 75 is rigidly connected to the valve stem and the other two valve members are spring-pressed and have lost-motion connections with the stem, as hereinafter described. The valve member 75 comprises a cylindrical head 78 which is slidably guided in the packing sleeve 62 and has a cupped rear end in which is carried a packing ring or washer 79 engageable with the valve seat 56. The valve stem has a reduced threaded front end 80 which is screwed into the head, the packing washer 79 being clamped by a metal washer 81 on the reduced front end of the stem. The slidable head 78 has an annular peripheral groove 82 receiving an O-ring 83 which bears on the inner cylindrical wall of the sleeve bore to provide a water seal. The front end of the head is provided with a radially extending pocket-forming T-slot 84.

A rotatable driver spindle 85 coaxial with the valve stem has an external screw thread 86 engaging in the internal screw thread 69 of the stationary packing sleeve 62, and further has a coaxial shanked rear button or disk 87 which slidably and rotatably fits in the T-slot 84 of the valve stem head 78, so that rotation of the screw-threaded spindle will axially shift the valve stem. The spindle has a squared front end 88 which fits in the hub of a handwheel 89 against relative rotation and is secured therein by an axial screw 90. The squared spindle end 88 is here shown to have a flat 91 to insure an oriented mounting of the handwheel on the spindle. The handle has an index mark 92 adapted to cooperate with indicia 92' on a vertical instruction plate 93 secured to the top of the valve body, as by screws 94, the indicia being here shown to include the directions "Soft," "Off," and "Wash" and associated arrows.

The valve stem 74 has a reduced cylindrical rear portion 95 on which are slidably mounted the valve members 76 and 77. A rearwardly facing annular shoulder 96 is formed on the valve stem at the front end of the reduced portion 95.

Each of the axially spaced valve members 76 and 77 comprises a thick cylindrical rubber body or disk 97 in the seat-engaging end portion of which is embedded or molded a flanged metal bushing 98, the valve disk having a central bore 99. The flat front face of the valve member 76 is adapted to engage the rearwardly facing valve seat 55, and the front face of the metal bushing 98 of this valve member is adapted to engage the rearwardly facing shoulder 96 of the valve stem. The flat rear face of the valve member 77 is adapted to engage the forwardly facing valve seat 51 on the retainer ring 50, and the rear face of the metal bushing 98 of this valve member is adapted to engage the stop-forming head of a screw 100 which is threaded axially into the rear end of the valve stem. The rubber body of each of the valve members 76 and 77 has a conically formed flexible lip 101 which slidably surrounds the valve stem section 95 and bears thereon to provide a water seal. A coiled spring 102 surrounds the valve stem section 95 between the valve members 76 and 77 and urges these valve members apart, the ends of the spring bearing on cupped metal washers 103 abutting on the lipped faces of rubber bodies of the valve members. Each washer 103 has a frusto-conical portion 104 accommodating the conical lip 101 of the adjacent rubber body.

The valve stem 74 and the valve members and various other parts associated therewith, including the cage 53, the packing sleeve 62 and the threaded spindle 85, form a sub-assembly adapted to be inserted as a unit into the stepped bore 45 of the valve body or casing 34. After this unit is inserted into the valve body, the unit is retained in position by the screw bushing 71 which also confines the sealing O-ring 73. The packing sleeve 62 is retained against rotation, but the cage 53 may be clamped in various random rotational positions. The valve stem and the valve members mounted thereon are free to rotate but rotation of these parts may or may not take place during manipulation of the valve, depending on relative frictional engagement of the parts. As soon as each valve member engages its associated seat, any rotation of the valve member ceases.

The vertical tubular body portion 36 has formed therein a transverse partition wall 105 which is spaced below the pipe boss 39 for the service pipe 32 and is provided with an axial outlet port 106 surrounded by an outwardly or upwardly facing conical valve seat 107. A shut-off valve member 108 cooperates with the valve seat 107 and comprises a packing washer 109 of rubber or other suitable material engageable with the valve seat 107 and clamped between an upper metal washer 110 and a lower downwardly converging, guide-forming nut member 111 by a screw 112. The valve member 108 is normally slightly open, as seen in Fig. 7, and the cylindrical upper portion of the guide member forms a restrictor almost closing the port 106. The shut-off valve member is clamped to the upper end of a vertical valve stem 113 by the screw 112. The lower end of the valve stem 113 is secured to a flow restrictor unit 114 disposed coaxially in the chamber 43, and the lower end of the flow restrictor unit is centrally secured to a diaphragm 115 of rubber or similar resilient material, Figs. 7, 9, and 12. The edge portion of the diaphragm is clamped between a peripheral flange 116 formed on the lower end of the tubular casing portion 36 and a complementary peripheral flange 117 formed on the upper end of the cover member 37, these flanges being secured together by screws 118. The flange 116 has a shallow recess 119 in which the diaphragm is confined. The water chamber 43 formed in the tubular casing portion 36 has a circular enlargement 43' over the diaphragm, this chamber being in free communication with the outlet port 106 and with the water passage 42. A second water chamber 120 is formed in the cover member 37 below the diaphragm and is provided with an outlet 121 from which water is discharged during the regeneration period. The flow restrictor unit 114, hereinafter more fully described, provides restricted communication between the chambers 43 and 120 to limit the rate of water flow during regeneration and rinsing and to establish a differential pressure on the diaphragm for closing the shut-off valve 108.

A tube 122 has one end connected by a fitting 122' with the outlet 121 of the chamber 120 and has its other end connected to a valve housing 123, Fig. 10, formed transversely over the front portion of the valve body and constituting a part of a clock-controlled pilot valve device 124 hereinafter described.

The back-wash flow restrictor 49, Fig. 7, is here shown to be of a type including a deformable or compressible rubber washer 125 housed in a centrally ported cup-shaped casing 126, the washer having a central port 127 the effective area of which is automatically adjusted in accordance with water pressure to maintain a substantially constant rate of flow under various water pressures.

The regeneration flow restrictor 114 includes a similar deformable rubber washer 128 with a central port 129 and housed in a centrally ported cup-shaped casing 130. Centrally ported inlet and outlet disks 131 and 132 abut against the upper and lower faces of the casing 130 and are secured thereto by a surrounding retainer sleeve 133 with inturned end flanges 134. The upper disk 131 has an upwardly projecting tubular hub 135 with lateral ports 136, and the valve stem 113 is screwed into the upper end of this hub. The lower disk 132 has a downwardly projecting screw-threaded tubular hub 137 projecting through a central opening 138, Fig. 12, in the diaphragm, the diaphragm being clamped to the disk by a threaded washer 139. The hub 137 has lateral ports 140 opening to the water chamber 120.

The pilot valve housing 123 formed transversely on the front end portion of the valve body is of generally cylindrical shape and has a horizontal cylindrical bore 141 including a closed reduced end 142 with which the water tube 122 communicates from below in a radical direction, as seen in Fig. 10. A tubular valve barrel 143, Figs. 7, 10 and 13, slidably fits in the bore 141 and is provided with axially spaced annular grooves 144 receiving sealing O-rings 145. Between the grooves, a vertical diametrically extending bore 146 is formed through the tubular barrel. A screw 147 threaded in the valve housing and engaging a sealing ring 148 extends into the upper end of the vertical bore 146 to retain the barrel in the housing. The lower end of the vertical bore 146 forms an outlet and registers with a vertical bore 149 in the valve casing, the latter bore opening into the drain chamber 64. The valve barrel has an inner axial bore 150, a reduced intermediate axial bore 151, and an outer axial bore 152, the latter forming a socket. A valve seat 153 surrounds the inner bore at the inner end of the barrel, and the inner bore communicates with the radial outlet bore 146. The intermediate bore 151 is provided with a sealing O-ring 154 retained by a pressed washer 155, and a radial set-screw 156 is threaded in the outer portion of the barrel at the socket-forming bore 152.

A pilot valve member 157 of the poppet type has a stem 158 slidable in the bore 151 and sealed by the O-ring 154. The pilot valve member includes a cupped head 159 carrying a packing washer 160 engageable with the valve seat 153, the valve being urged against the seat by a coiled spring 161 extending in end bore 142.

A valve timer 162, such as of the spring-driven clockwork type, includes a casing 163 with a tubular radial plug 164 extending into the valve barrel socket 152 and detachably secured therein by the set screw 156. The timer further includes a valve-opening plunger 165 extending axially in the plug 164 and engaging the adjacent end of the valve stem 158, the plunger passing through a sealing O-ring 166 in the plug. The timer includes a time shaft 167 rotatable clockwise in setting direction by a dial 168 and rotatable by the clock-work in counter-clockwise direction to permit spring-urged closing of the pilot valve at the end of a timing period. The timer is here shown to include a rock lever 169 for outwardly displacing the valve-opening plunger 165, the rock lever being latched in outwardly displaced position by a latch lever 170. The rock lever carries a rockably mounted spring-controlled pusher member 171 which is displaced by a cam projection 172 on the time shaft during the setting operation. The latch lever is tripped at the end of the timing period by a tripping pin 173 on the time shaft to permit spring-urged closing of the pilot valve.

The flow restrictor 114 carried on the resilient diaphragm 115 serves to limit the rate of flow of the regenerating solution and rinsing water from the chamber 43 to the chamber 120 when the pilot valve 124 is open during the regeneration period. Because of this flow restriction, the water pressure in the chamber 120 below the diaphragm is considerably lower than the pressure in the chamber 43 above the diaphragm, and the differential pressure thus produced presses the diaphragm downwardly, holding the shutoff valve 108 closed against tank pressure during this period. The restrictor-forming nut 111 at the upper end of the shut-off valve serves to permit building up of this differential pressure even if the service pipe pressure is abnormally low, as by reason of an open faucet. Under normal conditions the clock-controlled pilot valve 124 is closed, thus equalizing the pressure in the diaphragm chambers 43 and 120 and permitting the shut-off valve to open in the direction of forward flow through the service pipe 32.

The flow restrictor 49 controlled by the valve member 77 serves to limit the rate of water flow through the tank during the back-washing operation so as to avoid excessive disturbance of the mineral beds or loss of the zeolite or base-exchange material.

The regeneration or salt-rinsing operation requires a considerable period of time, for example about 45 minutes. During this period the shut-off valve 108 is closed by the diaphragm 115 so that no water would ordinarily be available in the service pipe. In some instances, it is desirable to permit a small emergency flow of raw or hard water in the service pipe during the regeneration period.

The control valve includes by-pass means to permit such hard water flow, without danger of introducing brine into the service pipe, and without danger of flow of hard water in the service pipe while the softener is in normal operating condition. A horizontal rib 174 is formed on a side of the valve body portion 35 and joins a vertical radial rib 175 formed on a side of the body portion 36. A bore or passage 176 is formed in and along the horizontal rib 174 and communicates at its front end with the inlet chamber 52 of the valve. The rear end of the bore 176 is screw-threaded and communicates with the upper end of an inclined bore 177 formed in and along the vertical rib 175, Fig. 9, the lower end of the bore 177 opening at the bottom face of the flange 116. A screw 178 closes the rear end of the horizontal bore 176 and is sealed by a packing ring 179. The cover member 37 is provided with a vertical side rib 180 having therein an inclined bore or passage 181 which opens at its upper end at the top face of the flange 117 in register with the lower end of the bore 177. The diaphragm 115 includes a gasket-forming tab 182 with an aperture 183 providing communication between the adjacent ends of the bores 177 and 181. The lower end of the bore 181 communicates with a chamber 184 formed axially in the tubular lower end of the cover member 37, the chamber 184 being closed at its lower end by a hollow screw plug 185. Between the lower diaphragm chamber 120 and the chamber 184 the cover has formed therein an intermediate axial chamber 186 which communicates with the chamber 184 through an axial port 187 the lower end of which is surrounded by a downwardly facing valve seat 188. A by-pass valve member 189 of the poppet type, similar to or identical with the pilot valve member 157, is disposed axially in the cover member and is adapted to close the port 187. The valve member 189 includes a valve stem 190 and a head 191 carrying a packing washer 192 engageably with the seat 188. The valve stem 190 projects upwardly through the port 187 and chamber 186 and into the diaphragm chamber 120 and is slidable in a headed bushing 193 screwed into the cover member between the chambers 120 and 186, the bushing having therein an O-ring 194 which seals the valve stem and is confined by a pressed washer 195.

The valve member 189 is urged or biased upwardly to closed position by a light coiled spring 196 housed in the hollow screw plug 185, and the upper end of the valve stem engages the bottom face of the lower hub 137 of the flow restrictor 114 to lift the shut-off valve 108 to the intermediate flow-restricting position seen in Fig. 7, the shut-off valve being in this position when no water flows in the service pipe 32. The shut-off valve 108 is movable upwardly from the position of Fig. 7 upon flow of soft water into the service pipe, and is movable downwardly by differential water pressure during regeneration to open the by-pass valve member 189. A vertical radial rib 197 extends along the rear side of the cover member 37 and has formed therein an inclined longitudinal passage 198 which extends from the chamber 186 to the upper face of the cover flange 117. A vertical rib 199 extends along the rear side of the vertical body portion 36 and has formed thereon a longitudinal passage 200 which opens at its lower end at the bottom face of the flange 116 in register with the upper end of the passage 198 and which opens at its upper end into the lower portion of the pipe boss above the valve seat 107 for the shut-off valve. The diaphragm 115 includes a gasket-forming tab 201 with an aperture 202 providing communication between the adjacent ends of the passages 198 and 200. The duct formed by the passages 176, 177, and 181, chamber 184, valve-controlled port 187, chamber 186, and passages 198 and 200 thus permits a limited flow of raw water to the service pipe during the regeneration period.

In the event that an emergency supply of raw water is not desired, the screw plug 178 of Fig. 5 is replaced by a longer screw plug 178', Fig. 14, thus blocking the raw water passage 176.

The indicia 92' on the instruction plate 93 provide directions for manipulating the control valve. In the normal or water-softening position of the control valve, the handle 89, Fig. 3, is turned counter-clockwise as far as it will go. In the flushing or back-washing position, the handle is turned clockwise as far as it will go. In the intermediate "Off" or stopping position of the valve, the water supply is shut off (except for a limited emergency flow of raw water) and the index mark 92 on the valve handle points in a generally upward direction to the "Off" legend on the instruction plate.

In the normal or "Soft" position of the control valve, shown in Fig. 7, the waste or drain port seat 56 is closed by the inwardly shifted valve member 75, the back-wash port seat 51 is closed by the spring-loaded valve member 77, and the spring-loaded valve member 76 is spaced rearwardly from the cage seat 55 by the valve stem shoulder 96, permitting access of hard or raw water under pressure from the supply pipe 31 through the inlet chamber 52, the open port formed in the cage within the valve seat 55, the cage ports 58, the valve body port 59, and laterally outwardly through the pipe 30 to the upper end of the softener tank 21. When a faucet in the service pipe 32 is opened, water flows downwardly through the softener tank, and softened water flows upwardly from the bottom of the tank through the pipe 29, rearwardly through the valve body passage 42, and upwardly through the chamber 43 and port 106 and past the valve disk 109 to the service pipe, the valve 108 being lifted by the water pressure to raise the restrictor-forming portion of the guide member 111 out of the port 106. The downward flow of the incoming water in the tank minimizes disturbance of the mineral and gravel beds in the tank. The by-pass valve member 189 remains closed, preventing flow of hard water into the service pipe through the by-pass passages.

When the softener requires regeneration, the valve handle 89 is first turned clockwise as far as it will go to place the valve in the flushing or back-washing position shown in Fig. 5. The manipulation of the handle rotates the threaded spindle 85 and draws the valve stem 74 forwardly until the front end of the valve stem head 78 abuts against the stop shoulder 70 in the packing sleeve. The packing sleeve slidably supports the valve stem head and maintains the alignment of the elongated valve stem. In a typical valve, the total rotation of the handle may range from one and one-half to slightly less than two turns, depending on the condition of wear on the valve parts. In the forward displacement of the valve stem the waste or drain valve member 75 opens first, then the valve member 76 closes, and finally the back-wash valve member 77 opens. The incoming raw or hard water now flows into the valve chamber 52, rearwardly past the open valve member 77 and through the flow restrictor 49 to the valve chamber 43, then forwardly along the passage 42 to the pipe boss 41, downwardly through the pipe 29 to the bottom of the tank, upwardly in the tank through the gravel bed 22 and mineral bed 23, outwardly from the upper end of the tank through the pipe 30 to the interior of the laterally ported cage 53, forwardly through the open front end of the cage 53 to the drain chamber 64, and downwardly and outwardly through the pipe boss 44 and drain pipe 33. The tank is thus flushed or back-washed in an upward direction, and floatage passes out through the drain pipe. The rate of flushing flow is limited by the flow restrictor 49 to avoid loss of the zeolite and filtering material, and the flow is continued for a few minutes until the water runs clear. During the flushing period the clock-controlled pilot valve device 124 remains closed.

After a suitable flushing or back-washing period, which usually ranges from five to ten minutes, the valve handle 89 is turned counter-clockwise for about three-quarters of a turn until the index mark 92 on the handle is upward, placing the valve in the "Off" position shown in Fig. 6. This rotation of the handle moves the valve stem 74 rearwardly until the back-wash valve member 77 engages the valve seat 51, the spring-pressed valve 76 remaining closed and the waste valve member 75 remaining open. The "Off" position of the control valve is not critical, as the valve members 76 and 77 will both remain closed during about 90° displacement of the valve handle, thus compensating for considerable wear on the valve members. Both valve members 76 and 77 being closed, the softener tank is shut off from the water supply so that the tank cover 25 can be removed to permit introduction of a measured charge of salt into the upper end of the tank. The tank cover is then replaced and the timer-controlled pilot valve 124 is then, if not previously, opened by the timer dial 168 and set to close after a regenerating and rinsing period, for example about 45 minutes, this period depending on the size of the tank. The valve handle is then turned counter-clockwise as far as it will go (about three-quarters of a turn) to its "Soft" position, restoring the control valve to the position shown in Fig. 7 except for the open condition of the pilot valve and raw water by-pass valve and closed condition of the shut-off valve. The serviceman or householder is then free to leave, as his work is completed. With the pilot valve in open position, there is a slight flow of raw water downwardly in the tank, the rate of flow being determined by the flow restrictor 114. During regeneration, salt water flows through the control valve and tank in the same path as the soft water in normal operation except that the salt water will not pass out the service pipe but instead flows from the diaphragm chamber 43 downwardly through the diaphragm-carried flow restrictor 114 into the chamber 120, through the tube 122 to the open timer-controlled pilot valve 124, thence into the valve casing drain chamber 64, and through the drain pipe 33. At the end of the regeneration period the water leaving the tank is free of salt. During regeneration the water pressure in the upper diaphragm chamber 43 is somewhat higher than that in the lower diaphragm chamber 120, thus exerting a downwardly-directed differential pressure on the diaphragm for holding the shut-off valve 108 closed. The closed shut-off valve prevents flow of salt water into the water heater and service pipe if a faucet in the house line should be inadvertently opened during the regeneration period. However, the downwardly shifted diaphragm holds the by-pass valve 189 open, thus permitting a small emergency flow of raw water to the service pipe, as hereinbefore described, this water being free of salt as it is drawn from the inlet chamber 52 which is directly connected with the raw water supply pipe 31.

After regeneration is completed and the time-controlled pilot valve closes, the water pressure on opposite sides of the diaphragm will become equalized through the flow restrictor 114, so as to release the tension on the shut-off valve stem 113, the shut-off valve 108 opening upwardly under the urge of the coiled spring 196 which also closes the by-pass valve 189. The system is then in normal condition to provide softened water to the service pipe or house line.

In the normal position of the control valve, the waste valve member 78 is positively closed by rotating the valve handle in the proper direction, the seating of this valve being unaffected by the presence of the valve members 76 and 77. In the "Off" position of the control valve, the valve members 76 and 77 are held against their respective seats by spring pressure and also by the water pressure in the inlet chamber 52. Each of the latter valve members has a sealing engagement with the valve stem, but any leakage which may occur along the valve stem when either or both of these valve members are closed would be insignificant and would be confined to the interior of the valve. If any of the valve members or their seats should require maintenance, the compound valve unit or sub-assembly can be easily removed from the valve casing.

If the raw water by-pass is not required, it is possible to make the shut-off valve 108 serve also as a check valve, this being accomplished by closing the raw water by-pass, as by means of the blocking screw 178' of Fig. 14, and removing the spring 196 for the by-pass valve 189, the latter being left in open position so that the shut-off valve disk 109 will normally rest on the valve seat 107, or be close thereto, in the absence of water flow to the service pipe. Upon reduction or cessation of pressure in the valve chamber 43 the hydrostatic head of water in the service pipe will then move the rubber valve disk 109 downwardly against the valve seat 107.

I claim:

1. In a valve structure adapted for use with a water softener of the regenerating type, a valve body having first and second chambers and a pressure-displaceable diaphragm separating said chambers, said first chamber adapted to receive softened water under pressure during normal conditions and to receive regenerant liquid under pressure during regenerating conditions, said first chamber having a liquid inlet and a liquid outlet, and said second chamber having a liquid outlet, said first chamber outlet including an outlet port and discharge conduit connection, means providing restricted communication between said chambers and normally equalizing the pressure in said chambers, a shut-off valve member for said outlet port movable to open and closed positions and operatively connected to said diaphragm to be moved by said diaphragm to closed position, a pilot drain valve controlling the outlet of said second chamber and movable to open and closed positions, said drain valve when open reducing the pressure in said second chamber whereby the liquid pressure in said first chamber acting on said diaphragm will close said shut-off valve, a raw water supply conduit communicating with said discharge conduit connection downstream of said outlet port, valve means in said raw water supply conduit movable to open and closed position and normally in closed position, and means controlled by said pressure-displaceable diaphragm for opening said last-named valve means when said shut-off valve is closed by said diaphragm, said last-named valve means including a biasing spring normally urging said valve means to closed position and acting through said diaphragm to urge said shut-off valve member to slightly open position.

2. In a valve structure adapted for use with a water softener of the regenerating type, a valve body having first and second chambers and a pressure-displaceable diaphragm separating said chambers, said first chamber adapted to receive softened water under pressure during normal conditions, said first chamber having a liquid inlet and a liquid outlet, and said second chamber having a liquid outlet, said first chamber outlet including an outlet port and a discharge conduit connection, a flow restrictor carried by and movable with said diaphragm and having a liquid passage providing restricted communication between said chambers and normally equalizing the pressure in said chamber, a shut-off valve member for said outlet port movable to open and closed positions and including an actuating stem connected to said flow restrictor to be moved by said diaphragm to closed position, means forming a raw water supply conduit communicating with said discharge conduit connection downstream of said outlet port, and valve means in said raw water supply conduit movable to open and closed positions and normally in closed position, said last-named valve means including a reciprocable valve member spring-urged to closed position and having an actuating connection with said diaphragm to be moved by said diaphragm to open position when said shut-off valve is closed by said diaphragm, said spring-urged valve member when in closed position acting through said diaphragm to hold said shut-off valve in slightly open position.

3. In a valve structure adapted for use with a water softener of the regenerating type, a valve body including a hollow portion having therein a first chamber adapted to receive softened water under pressure during normal conditions, a cover member secured to said hollow body portion and having a second chamber therein, a pressure-displaceable diaphragm interposed between said hollow portion and cover member and separating said chambers, said first chamber having a liquid inlet and a liquid outlet, and said second chamber having a liquid outlet, said first chamber outlet including an outlet port and a discharge conduit connection, means providing restricted communication between said chambers and normally equalizing the pressure in said chambers, a shut-off valve member for said outlet port movable to open and closed positions and operatively connected to said diaphragm to be moved by said diaphragm to closed position, a pilot drain valve controlling the outlet of said second chamber and movable to open and closed positions, said drain valve when open reducing the pressure in said second chamber whereby the liquid pressure in said first chamber acting on said diaphragm will close said shut-off valve, means forming a raw water supply conduit communicating with said discharge conduit connection downstream of said outlet port, said conduit including portions extending through said hollow body portion and cover member, and valve means mounted in said cover member for controlling said raw water conduit and movable to open and closed positions, said last-named valve means being normally spring-urged to closed position, and having an actuating connection with said pressure-displaceable diaphragm for opening said valve means when said shut-off valve is closed by said diaphragm.

4. In a valve arrangement for a water softener of the regenerating type, a valve body having a first tubular portion and a second tubular portion, said second tubular portion being disposed at an end of said first tubular portion and extending transversely thereof, said second tubular portion having a first chamber with a port adapted to pass softened water under pressure into said chamber and to pass raw water out of said chamber, said second tubular portion being further provided with an outlet port, a cover member closing the end of said second tubular portion remote from said outlet port and having therein a second chamber with a liquid outlet, a pressure-displaceable gasket-forming diaphragm separating said chambers and interposed between said second tubular portion and cover member, means providing restricted communication between said chambers and normally equalizing the pressure in said chambers, a shut-off valve member for said first chamber outlet movable to open and closed positions and operatively connected to said diaphragm to be moved by said diaphragm to closed position, a pilot drain valve controlling the outlet of said second chamber and movable to open and closed positions, said drain valve when open reducing the liquid pressure in said second chamber whereby the liquid pressure in said first chamber acting on said diaphragm will close said shut-off valve, and reciprocable valve means in said first tubular portion for controlling selective flow of softened and raw water with respect to said first-named port.

References Cited in the file of this patent
UNITED STATES PATENTS

| 338,771 | Page et al. | Mar. 30, 1886 |
| 587,786 | Brown | Aug. 10, 1897 |
| 680,852 | Foster | Aug. 20, 1901 |
| 928,403 | Seaver | July 20, 1909 |
| 2,299,624 | Harper | Oct. 20, 1942 |
| 2,703,105 | Stoner | Mar. 1, 1955 |
| 2,768,950 | Kryzer | Oct. 20, 1956 |

FOREIGN PATENTS

| 478,156 | Great Britain | of 1938 |